Sept. 25, 1934.  F. VON OPEL  1,974,884
STEERING APPARATUS FOR AIRCRAFT
Filed Feb. 1, 1932   7 Sheets-Sheet 1
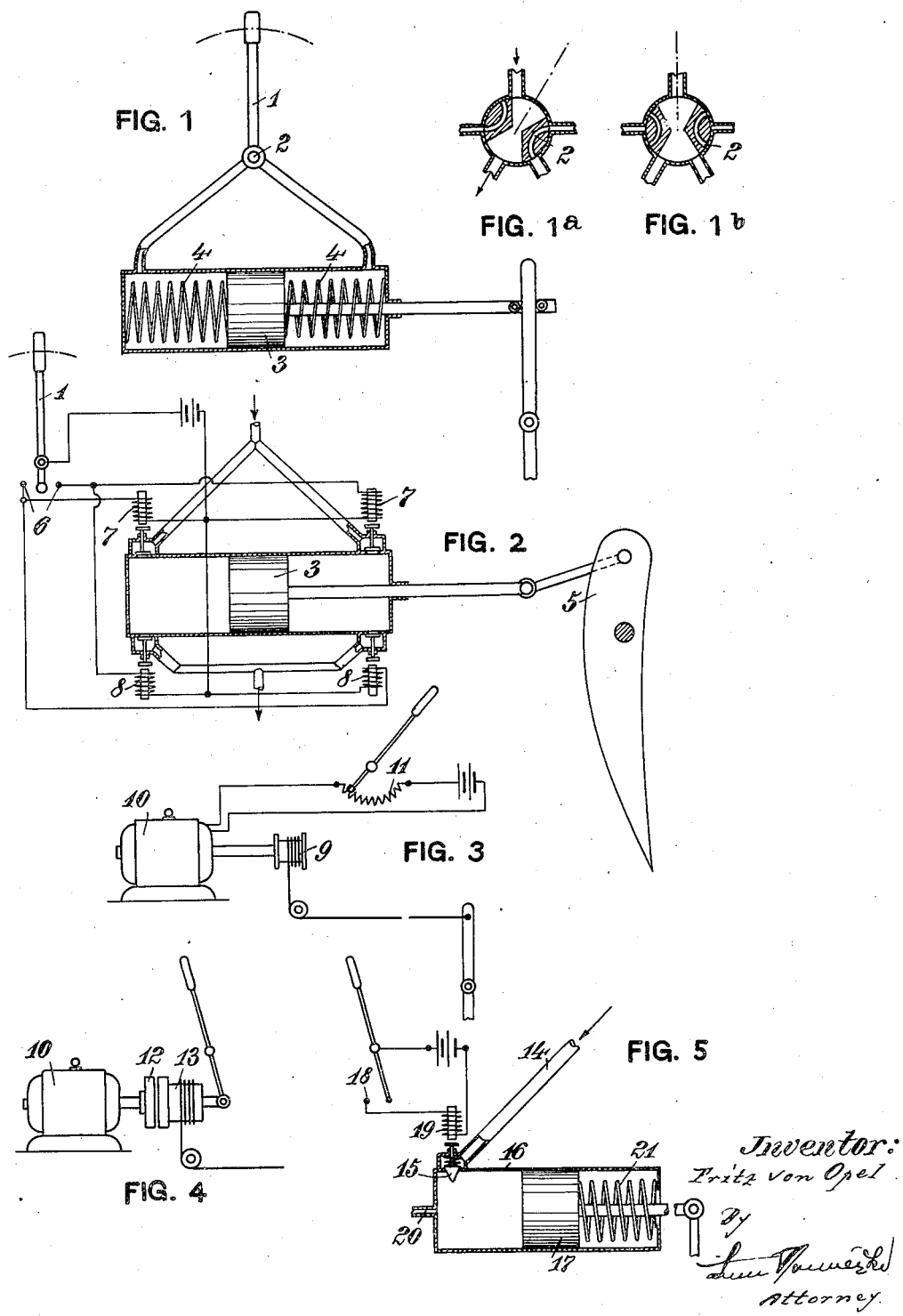

Sept. 25, 1934.  F. VON OPEL  1,974,884
STEERING APPARATUS FOR AIRCRAFT
Filed Feb. 1, 1932   7 Sheets-Sheet 2

Inventor:
Fritz von Opel
by
Attorney

Sept. 25, 1934.    F. VON OPEL    1,974,884
STEERING APPARATUS FOR AIRCRAFT
Filed Feb. 1, 1932    7 Sheets-Sheet 3

Inventor:
Fritz von Opel
Attorney.

Sept. 25, 1934.  F. VON OPEL  1,974,884
STEERING APPARATUS FOR AIRCRAFT
Filed Feb. 1, 1932   7 Sheets-Sheet 4
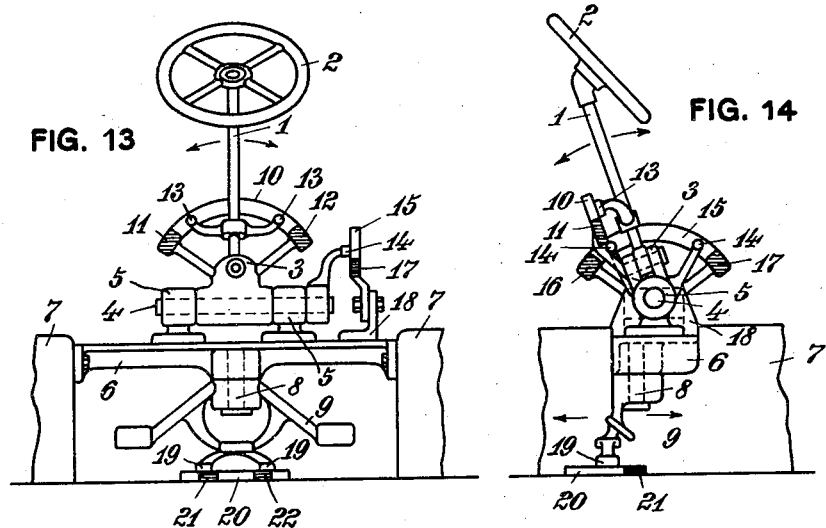
FIG. 13
FIG. 14
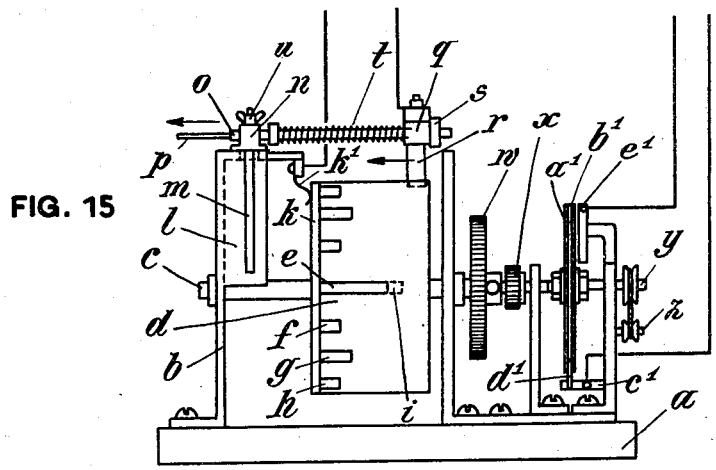
FIG. 15
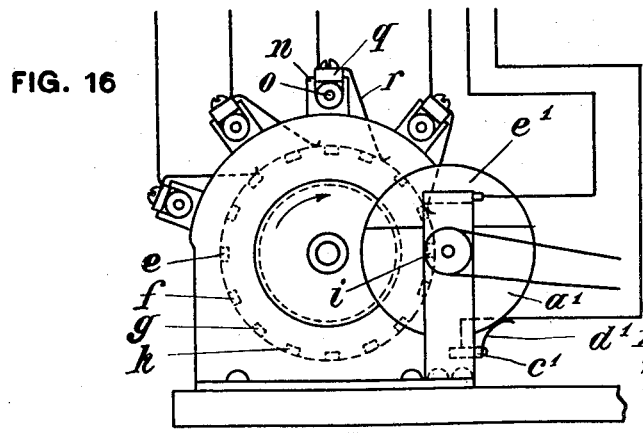
FIG. 16
Inventor:
Fritz von Opel
Attorney Sept. 25, 1934.     F. VON OPEL     1,974,884
STEERING APPARATUS FOR AIRCRAFT
Filed Feb. 1, 1932     7 Sheets-Sheet 6

Inventor:
Fritz von Opel
By [signature]
Attorney.

Sept. 25, 1934.  F. VON OPEL  1,974,884
STEERING APPARATUS FOR AIRCRAFT
Filed Feb. 1, 1932   7 Sheets-Sheet 7

Inventor:
Fritz von Opel
By
Attorney

Patented Sept. 25, 1934

1,974,884

UNITED STATES PATENT OFFICE

1,974,884

STEERING APPARATUS FOR AIRCRAFT

Fritz von Opel, Russelsheim-on-the-Main, Germany

Application February 1, 1932, Serial No. 590,263
In Germany February 27, 1931

13 Claims. (Cl. 244—29)

My invention relates to steering apparatus for aircraft, i. e. airships and airplanes.

It is one of the objects of my invention to provide a steering apparatus which is operated without fatiguing the pilot. To this end, in combination with a steering member such as a rudder or elevator, I provide a servo mechanism for operating the member.

The servo mechanism may be controlled by the pilot or by transmitted current impulses.

In a preferred embodiment of my invention, I provide a valve, or a set of valves, in combination with a fluid-controlled, i. e., pneumatic or hydraulic, servo mechanism, as a rule a piston in a cylinder, and means such as electromagnets controlled by the impulses, for operating the valve or valves. By these means, the amount of fluid admitted to the servo mechanism, and the periods at which the fluid is admitted, retained or discharged, may be varied as desired for operating and arresting the piston and the steering member to which it is connected.

The cylinder has an outlet and the position and the movement of the piston are determined by the rate at which the fluid is admitted and discharged.

Other objects of my invention will appear from the following specification and the accompanying drawings in which Fig. 1 is a sectional elevation of a pneumatic or hydraulic servo cylinder with a piston operatively connected to the steering member, and a two-way valve for controlling the piston, Figs. 1a and 1b showing details, Fig. 2 is a sectional elevation of a cylinder having electrically operated control valves at both ends, Fig. 3 is a diagram of a plant having an electric servo motor, Fig. 4 is a diagram of a plant like that shown in Fig. 3, but with a clutch combined with the motor, Fig. 5 is a sectional elevation of a cylinder having a single operated control valve at one end, Fig. 6 is a diagram of an automatic steering system, Fig. 7 is an elevation, and Fig. 8 is a plan view of a rotary frame antenna for locating transmitters, Figs. 9 and 10 show modified contacting devices for the rotary antenna, Figs. 11 and 12 show contacting devices operated by a rotary condenser, Fig. 13 is a partly sectional end elevation, and Fig. 14 is a partly sectional side elevation, viewed from the left in Fig. 13, of an apparatus for the wireless steering of air craft, Fig. 15 is a side elevation, Fig. 16 is an end elevation, viewed from the right in Fig. 15, Figs. 17 and 18 are details, of another wireless steering apparatus, Figs. 19 to 23 illustrate systems for reading the instruments of an air craft from a station by wireless, and Fig. 24 is a diagram of a plant for preventing interference with the wireless steering of aircraft.

Referring now to the drawings, and first to Figs. 1 and 2, 3 is a piston in a pneumatic or hydraulic cylinder, 4, 4 are return springs at opposite sides of the piston 3, 2 is a two-way valve the casing of which is connected to opposite ends of the cylinder and to a supply of gas or liquid under pressure, and 1 is a handle for operating the valve 2. The piston 3 is operatively connected to a control member such as a rudder or elevator, an elevator being shown at 5 in Fig. 2 by way of example.

If the pilot moves the handle 1 to the right in Fig. 1 the valve 2 connects the supply of energy to the pipe at the left of the cylinder as shown in Fig. 1a and the piston 3 moves to the right, compressing the spring 4 at the right. Fig. 1b shows the neutral position of the valve 2 in which the combined action of the springs 4 returns the piston 3 to its central position in the cylinder.

Referring now to Fig. 2, the piston 3 is connected directly to the control member 5 by suitable tackle, and the cylinder has inlet valves at both ends at its upper, and outlet valves at its lower side. The inlet valves are connected to a supply of medium under pressure, and the outlet valves to a discharge pipe. The valves close automatically and are opened by electromagnets 7, 7 and 8, 8 in a circuit having a contact pair 6 under the control of handle 1 by which the pilot opens and closes the contacts 6.

Referring now to Fig. 4, 10 is an electric motor, with a drum 9 on its shaft for winding up a cable connected to a control member, and 11 is a resistance in the circuit of the motor for regulation by the pilot. The motor winds the cable until the resistance is equal to its torque, and the pilot by varying the resistance 11 may cause a corresponding stroke of the steering member.

Referring now to Fig. 4, the winding drum 13 is connected to the motor shaft by a friction clutch 12 the pressure of which is regulated by the pilot. Gearing, not shown, may be inserted between the motor and the drum or clutch, and the motor may be designed for rotation to the right or the left, as desired.

While in the apparatus illustrated in Figs. 1 to 4 the movement imparted to the steering member is determined by the operation of the pilot's handle, Fig. 5 shows an apparatus in which the operation may be controlled by current impulses and the pilot only closes a circuit. Referring to Fig. 5, the piston 17 in the cylinder is equipped with a return spring 21 at one end only and 15 is an inlet valve at the opposite end of the cylinder. 14 is a pipe connecting the inlet valve to a supply of energy, not shown, 20 is a small outlet pipe at the closed end of the cylinder, 19 is an electromagnet for opening the valve 15 and 18 is a contact in its circuit which is closed by the pilot's handle.

When the pilot has closed the contact 18, current impulses, preferably by an interrupter operated mechanically, and not manually, are caused to act on the electromagnet 19 and to control the inlet valve 15 which in turn regulates the admission of medium to the cylinder 16. When the valve 15 is closed the air in front of the piston 17 is expelled through the small pipe 20. The position of the piston 17 is determined by the duration and intensity of the current impulses. The pilot may regulate the velocity at which the interrupter rotates, by cutting in resistances or by mechanical means so as to vary the frequency of the impulses.

It is not necessary that the pilot should control the servo mechanism but means for controlling it from apparatus on the craft, or from wireless stations, may also be provided. It has already been proposed to control the steering member by compasses or other direction indicators but in such systems the force required for steering was rather considerable so that it was necessary to provide strongly acting devices, such as very heavy gyroscopes or compasses, for elimination of all reactions of the steering members on the indicators. Such heavy auxiliaries are obviously undesirable.

Referring now to Fig. 6, 1 is the casing of a compass with a needle 2 and a mirror 3 on its axis. 4 is a source of light and 5, 6 are two photoelectric cells which are shown outside the casing 1 but may also be arranged within the casing.

When the aircraft moves straight ahead the beam of light from mirror 3 does not influence the cells 5, 6. If the aircraft departs from the straight path, one of the cells is struck by the beam of light which cell, through suitable relays, not shown, controls the steering member or servo mechanism. Preferably the beam is so wide that more light is thrown on a cell as the angle increases and the power for returning the steering member is increased in proportion.

An apparatus of this type has the advantage of eliminating any heavy apparatus such as gyroscopes and the like, and it has the other advantage that selective control is readily effected by providing a glow lamp 7 and 8 per cell which are caused to glow by any suitable, if desired, wireless means and control the cells independently of the mirror 3.

Obviously the mirror 3 may be replaced by a source of light and the needle 2 by an annular strip with perforations for the light which may be so designed as to admit more or less light to the cells as the strip rotates.

The currents generated in the cells 5, 6 may be utilized for charging condensers which may be discharged by tilting, the discharge impulses, with or without amplifiers, controlling the steering relays. By these means any kind of indicators such as altimeters, compasses and the like, may be used for controlling the relays, or an automatic direction-finder antenna which in addition to permitting continuous watching of the course steered, also controls the servo mechanism.

My invention also relates to improved means for ascertaining the position of the craft with respect to a station, or stations, by means of a direction finder antenna. Apparatus of this type as designed heretofore have the drawbacks of requiring skilled operators, of slow reaction and of permitting ascertaining the position of one station only at a time.

According to my invention I provide a rotary antenna, or a group of fixed antennæ in star arrangement, in combination with a rotary contact or similar means. A high-frequency receiver at the antenna or contact amplifies the incoming high-frequency energy. The amplified impulses are admitted to a spark gap which is operated by the rotary antenna and has a scale for reading directly the direction in which the energy arrives. This apparatus reacts immediately on abrupt alterations of the angle at which the energy arrives, for instance, if the air craft turns or the station varies its position, and may be read by unskilled persons.

If a rotary contact is provided instead of a spark gap it may cut in apparatus such as luminous tubes, motors and the like, when impulses arrive.

It is also possible to employ a high-frequency receiver with low-frequency amplification in which case a relay is connected instead of a telephone and the spark gap or slip contact controlled from the relay.

If it is desired to locate several transmitters at a time the rotary member may be connected to several separate antennæ systems the impulses of which are admitted to one, or individual, spark gaps over several receivers.

Referring now to Figs. 7 and 8, 1 is a frame antenna in a frame 2 to which rotation is imparted by any suitable means, such as the pulley 3, from a motor or other driving mechanism. 4 is a spark gap below the antenna and 5 is one terminal of the gap which rotates with the antenna. The other terminal is a ring 6. 7 is the base plate of the frame 2, and 8 and 9 are wires connected, respectively, to the terminals 6 and 5.

Referring to Fig. 9, a slip contact is provided instead of the spark gap shown in Fig. 8, the contacts 6a, 6b, 6c, etc. on which the rotary terminal 5a moves, being connected to luminous tubes, motors or the like.

Fig. 10 shows fixed antennæ pointing to various directions of the compass, and the contacts 6a, 6b . . . are connected to the individual antennæ.

The antenna 1, Fig. 7, rotates at high speed and is equipped with an amplifier the amplified impulses of which are admitted to the spark gap, Fig. 2. The position of a transmitter is indicated by the sparks at the terminals 5 and 6 and read on the scale of ring 4.

Groups of fixed antennæ in star arrangement are connected to the slip contact Fig. 9 which transmits the arriving impulses to the receiver from which they are admitted to the spark gap in amplified condition, and the angle of the arriving energy is read as described.

In order to obtain better readings the amplification at the receiver may be weakened by regulating heating, coupling, etc., so that a spark will jump only at a given angular position, or it may be amplified so that there will be no sparking at one angular position only. A condenser may be connected to the spark gap for concentrating the sparking.

Several transmitting stations may be located if a wavemeter of special design is provided as the receiver. Normal wavemeters have the drawbacks of being slow and of not reacting abruptly enough on sudden or strong variations, and of requiring skilled operators.

The apparatus illustrated in Figs. 11 and 12 does away with all these drawbacks by permitting reading any number of waves at the same time and on the same scale and following all variations of wave length without loss of time.

In wavemeters as designed heretofore members such as rotary condensers were mostly adjusted by hand while according to my invention they are rotated at high speed and positively control a rotary slip contact or terminal with an annular fixed terminal. The two terminals are in the circuit of a relay controlled by the wave receiver.

Apparatus of this type are shown in Figs. 11 and 12.

Referring first to Fig. 11, R is a fixed, and S is a rotary terminal, to which rotation is imparted by a rotary condenser, not shown, with or without gearing. When the condenser rotates a relay is operated as often as a wave is passed and this relay closes the circuit of the spark gap R, S. The spark jumping from S to R indicates at which angular position of the condenser the relay was closed and an impulse was received. Any number of wave lengths may be measured and read at the same time.

Referring to Fig. 12, a slip contact K in combination with fixed contacts A, B, C, . . . may be provided, and devices of any kind, such as incandescent lamps, may be connected to contacts A, B, C . . . and controlled in conformity with the length of the waves received.

Instead of a relay in the low-frequency circuit of a high-frequency-low-frequency receiver, obviously the high-frequency circuit of the receiver, with or without amplification, may be employed for forming the sparks at the gap.

Wireless means for controlling the steering members of air craft will now be described. Preferably the system is combined with apparatus such as shown in Fig. 5 which is controlled by current impulses of various frequency and duration.

In the wireless steering of airplanes or groups of airplanes a sender is provided for transmitting impulses on a definite wave length, or at a definite rhythm, and various commands are performed at the receivers on the airplanes by means resembling automatic selectors. Apparatus as designed, however, are not satisfactory because airplanes move in three dimensions and it is necessary to transmit a series of commands at the same time.

According to my invention a definite wave length is allotted to each command. This also much increases the reliability because if the reception of one wave is disturbed all other commands will be received properly. In order to reduce the number of transmitters required all opposite controls which are never operated at the same time, for instance the right and left rudders, are each controlled by a transmitter each of which is equipped with means for sending two or more distinct wave lengths.

If a group of airplanes are to be steered from a station a new group of waves might be provided for each additional plane but this would require a large number of transmitters which in the present instance are dispensed with by employing polarized waves which by means of any suitable devices such as mirrors, are supplied to a given plane only. In this manner a large group of planes are controlled by few senders.

In order to facilitate the wireless steering of aircraft the sender should be designed like the normal controls of aircraft.

An example for such a control is illustrated in Figs. 13 and 14.

The stick 1 and the steering wheel 2 are designed as in airplanes and mounted to rock between the jaws of a guide 3 which is fixed on a shaft 4 in bearings 5. The bearings 5 are secured to a bracket 6 of angle section which is secured to walls 7 at both ends. 8 is a vertical pin at the centre of the bracket 6 about which the rudder pedal 9 is mounted to rock. 10 is a frame which is rigidly connected to the guide 3 and has contacts 11 and 12 for the twisting of the planes at the right and at the left. 13 are slip contacts at the stick 1 which slide along the frame 10. 14 are slip contacts at one end of shaft 4 which slide on a sector 15. 16 and 17 are the contacts for the up and down controls arranged at opposite ends of frame 15. Frame 15 is attached to an angle bracket 18 which in turn is fixed on the bracket 6. 19 are slip contacts on the pedal 9 which slide on a sector having contacts 21 and 22 for the rudder.

The control is operated like the normal airplane controls. By operating the control at the sender the corresponding operations are performed on the plane or planes to which waves are transmitted.

By moving the stick 1 sideways the slip contacts 13 are moved into engagement with contacts 11 or 12. This cuts in the sender for twist at the right or the left and the same operation is performed by wireless on the plane. By moving the stick backwards and forwards the shaft 3 is turned and the slip contacts 14 are connected to the contacts 16 and 17, cutting in the sender for the operation of the elevator. The rudder pedal connects the slip contacts 19 and contacts 20 or 21, cutting in the sender for the rudder and causing corresponding operations at the plane.

For steering airplanes by wireless in the manner described it is often inevitable to call on receivers adjusted for various wave lengths at the same time, or practically so, from a central. This difficulty was eliminated heretofore by employing for each receiver a sender separately adjusted for the receiver's wave length.

It is an object of my invention to eliminate this complication by rendering possible the operation of a single sender at the transmitting side. The sender may be equipped with a set of frequency-varying means, such as condensers, variometers, etc. connected in parallel which at the moment of operation are cut into the tuning circuit of the sender individually or in groups in conformity with the frequency required. Or the adjustment of the frequency-varying means is varied periodically, for instance by continuous rotation or reciprocation of the tuning condenser, so that a frequency range of any desired breadth is passed periodically upon adjustment, an operation and the sending of an impulse of the desired wave length occurring positively as often as a desired wave length is passed.

Figs. 15 to 18 illustrate an apparatus of the first-mentioned type. $a$ is a foundation plate, $b$ is a bracket on the plate, $c$ is a shaft in the bracket and $d$ is a cylinder of insulating material on the shaft. The cylinder has a set of contact strips $e$, $f$, $g$, $h$, $i$ . . . which are all connected to a slip ring $k$ at the left end of the cylinder, and $k'$ is a contact spring for cooperation with the ring $k$. 1 is a semicircular holder with a slot $m$ for the reception of supports $n$ in a slot $m$ which are adapted to be shifted in the slot and provided with means such as thumb nuts for fixing them in a given position. Each support has a pipe $o$ for the reception of a Bowden or other cable $p$. Mounted to slide on each pipe $o$ is an auxiliary support $q$, with a contact spring or brush $r$. $s$ is a check at the outer end of the pipe $o$, and $t$ is a spring on the pipe which tends to hold the auxiliary support $q$ against the check $s$.

$w$ and $x$ are a spur gear and a pinion which form part of a gearing connecting the shaft $c$ to a driving shaft $y$ to which rotation is imparted from the shaft $z$ of an electric motor, not shown. $a'$ is a disk of insulating material on the shaft $y$ which is laid with metal foil so as to form a condenser, and $b'$ is a contact ring on the perimeter of the disk on which a contact spring $d'$ on an insulating block $d'$ bears. $e'$ is a fixed metal plate which with the layer of metal foil or the like on the disk $b'$ makes a condenser.

There are four supports $n$ in the holder 1 and sixteen contact strips in the cylinder $d$, as shown in Fig. 16, having five distinct lengths. The condenser disk $a'$ rotates at 16 times the velocity of the cylinder shaft $c$. If the auxiliary supports $q$ are at the outer ends of their stroke on the pipes $o$ the spring or brush $r$ does not make contact with any one of the strips on the cylinder. When the cable $p$ is pulled in the direction of the arrow in Fig. 15, the spring or brush makes contact in succession with the following strips: $i$, making the circuit once per revolution, $i$ and $e$, two makes per revolution, contact strips which are at the top and the bottom of the cylinder $d$ in the position shown in Fig. 15, and not visible, four makes per revolution, and finally four contact strips $g$, eight makes per revolution. If the spring or brush $r$ is at the left end of its stroke, it makes contact with all sixteen strips, corresponding to 16 makes per revolution.

Instead of a condenser $a'$ $e'$ I may provide any other suitable means such as one or more variometers.

It will be understood that the condenser etc. $a'$, $e'$ effects a continuous variation of the wave frequency while at the same time the contacting of the sender is effected by the rotary cylinder $d$, its strips and the spring or brush $r$. By the ratio of the rotary condenser and the cylinder a desired wave length is automatically transmitted, and sixteen impulses of the same frequency may be emitted per revolution of the cylinder $d$. In order to adjust the sender for another wave length it is only necessary to shift the supports $n$ on the holder $l$, varying the relative angle of the cylinder and the contacts and effecting the operation of the contacts at another time or at another position of the condenser. Obviously, any number of supports $n$ may be provided, with any number of pipes $o$ and springs $t$ per support. For instance, there may be 64 emissions for four distinct wave lengths, per revolution of the cylinder $d$. The width of the contact strips on the cylinder or the disk is also of influence as it is possible to coordinate to the impulses a wave band of any desired width which results from the capacity variation of the condenser. The capacity variation is caused by the angular relative displacement of the cylinder and the condenser while the spring or brush $r$ bears on the strips. The width of the wave band consequently is a function of the width of the strips on the cylinder $d$. A wide band is desirable where receivers of low selectivity are used and where frequency fluctuations of the transmitter are to be compensated.

In order to steer an airplane which is out of view from any desired station it is necessary to remain in permanent communication with the plane. Vehicles of various kinds have already been equipped with means for measuring the speed, the altitude, the course steered, the angle of inclination, oil pressure, cooling water temperature, etc. However, in the old systems the instruments could only be read on the vehicles while the present invention permits reading them from a station by wireless. For instance, the index of a motor-car speedometer may be replaced by a condenser plate in the circuit of a sender. If the speed of the vehicle is varied the position of the movable condenser plate varies also with respect to the fixed plate and the wave length is altered by the capacity variation. This length variation can be measured from any point by wavemeters and will indicate the speed of the vehicle.

The condenser may be modified by equipping it with a movable plate at the index of the measuring instrument which moves past several fixed condenser plates of various sizes. Or the index may be a slip contact at one side which as the index moves comes into contact with various contacts to which condensers of various sizes are connected.

Figure 6:
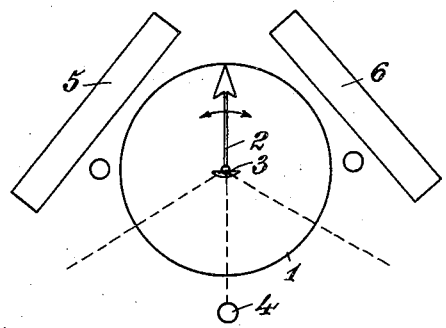
Figure 7:
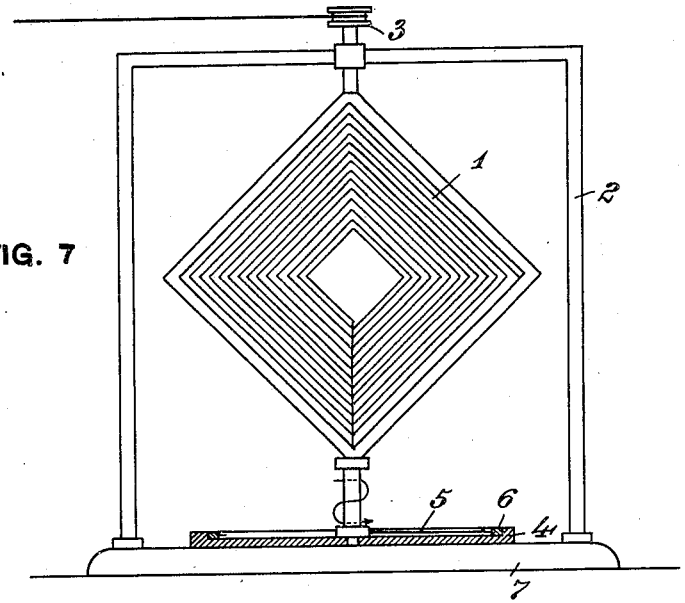
Figure 8:
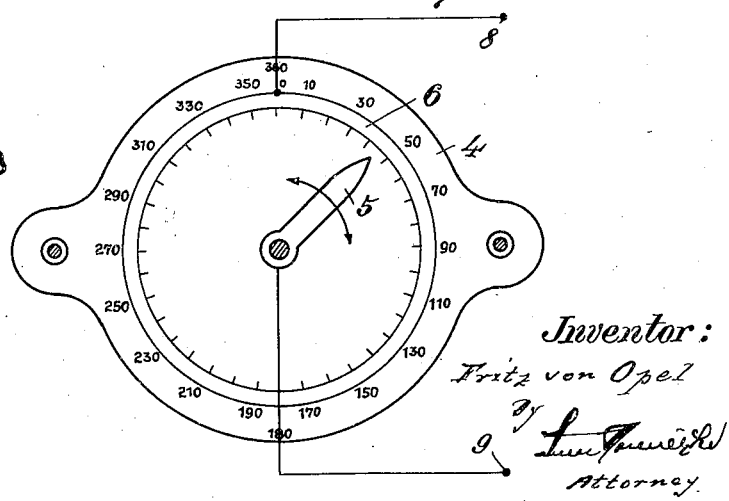
Figure 9:
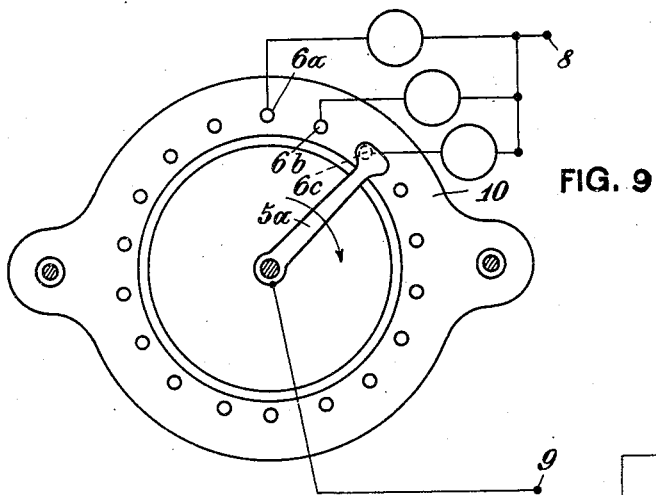
Figure 11:
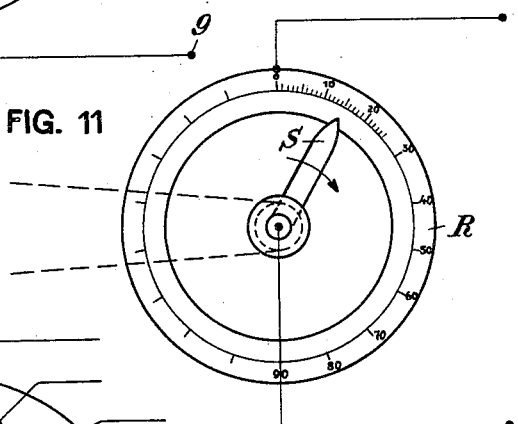
Figure 10:
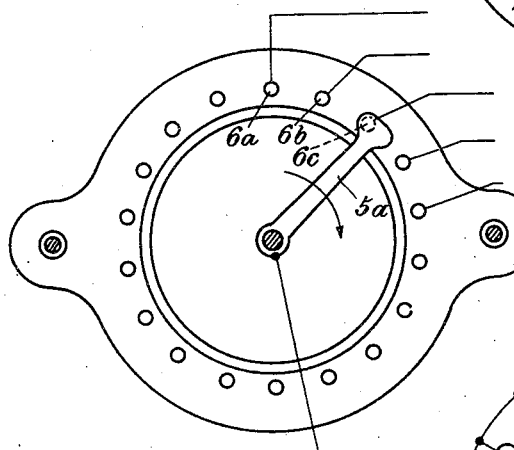
Figure 12:
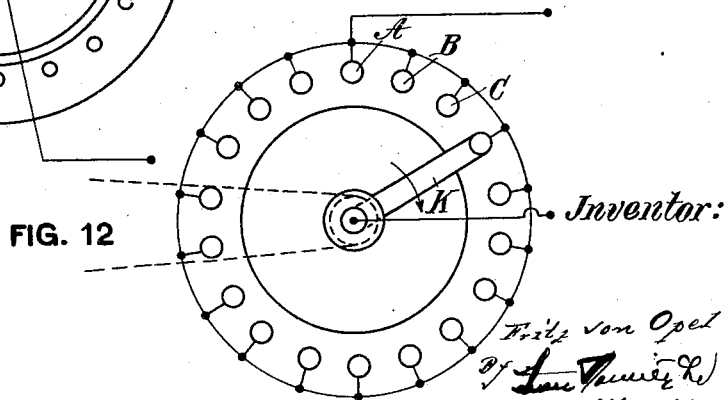
Figure 17:
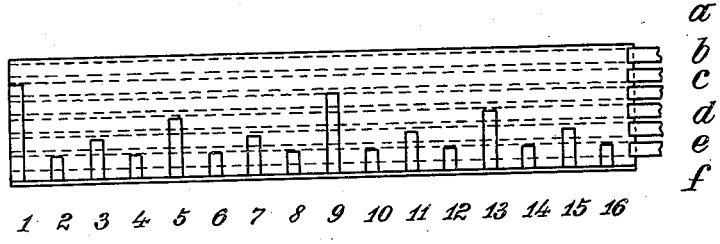
Fig. 17 shows the cylinder $d$ developed, with the contact strips numbered 1 to 16, and the positions of the spring or brush $r$ shown in dotted lines and marked $a$ to $f$. The number of makes per revolution of the cylinder $d$ will appear from Fig. 17.
Figure 18:
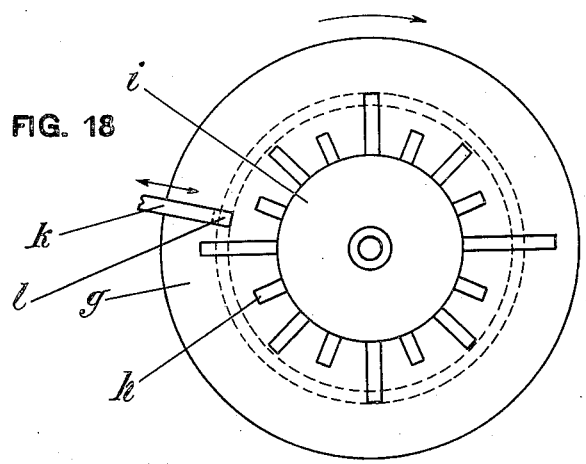
Fig. 18 shows the cylinder $d$ replaced by a disk $g$ of insulating material, one of the strips being shown at $h$. $i$ is the slip ring which connects all strips, and $k$ is a spring corresponding to the spring or brush $r$. In the position illustrated the spring has four makes with the radial contact strips per revolution of the disk $g$.
Figure 19:
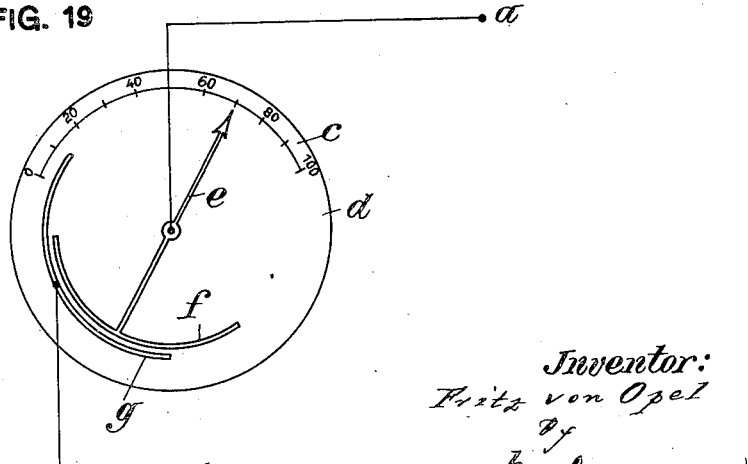

Apparatus embodying this part of my invention are illustrated in Figs. 19 to 23. In all Figs. $a$ and $b$ are the connections to the sender, $c$, Fig. 19, is the scale of a measuring instrument $d$ along which the index $e$ moves, $f$ is a condenser plate at one end of the index and $g$ is a fixed plate along which the movable plate $f$ is displaced if the index $e$ is rotated. A capacity corresponding to the temporary position of the index is cut into the sending circuit and thereby the wave length adapted to the position of the index $e$.

Figure 20:
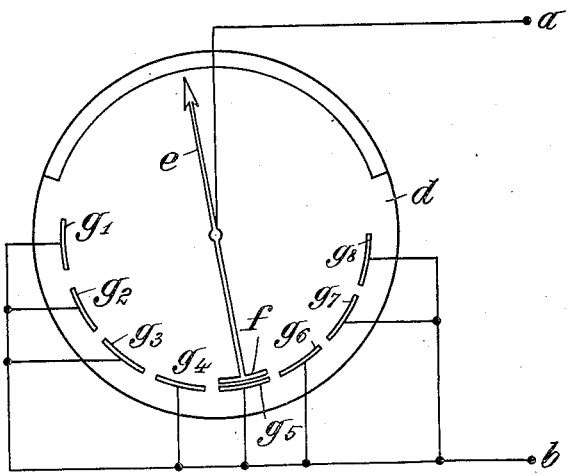

Referring to Fig. 20, the condenser plate $g$ is subdivided into eight plates $g'$ to $g8$ along which the plate $f$ on the index $e$ moves.

Figure 21:
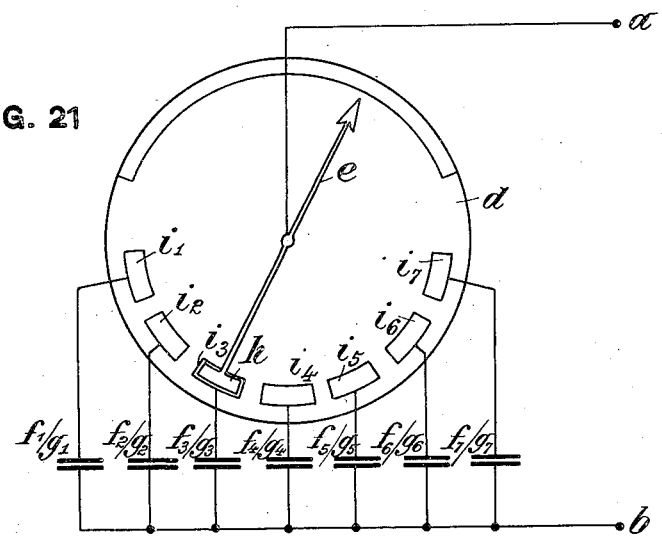

Referring to Fig. 21, $i'$ to $i7$ are fixed contacting elements on the instrument $d$, and $h$ is a contact at one end of the index $e$. Condensers $f'/g'$ to $f7/g7$ of various sizes are connected to the contacting elements so that various capacities are cut into the sender circuit in conformity with the position of the index e.

The apparatus described permit only the transmission of the readings from a single instrument. However, the condensers at the sender which are connected to several instruments, may be connected in parallel and a contact rotated by a motor or clockwork may be provided for short-circuiting only one condenser at a time. Preferably the relative size of the condensers is so determined that the indications of the first instrument are transmitted on a wave length of the order of 1–100, those of the second instrument at 101–200, etc.

Figure 22:
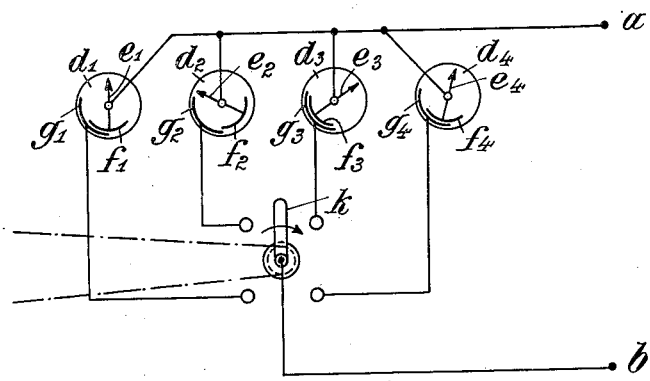

Fig. 22 shows a multi-condenser instrument, with four indicating instrument units $d'$ to $d4$, with indexes $e'$ to $e4$, and condensers $f'/g'$ to $f4/g4$, the condensers being connected in parallel, and $k$ is a rotary contacting spring by which the condensers are successively connected to the sender circuit $a$, $b$.

Figure 23:
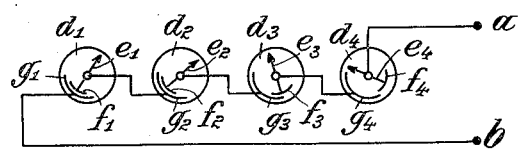

As shown in Fig. 23, the condensers $f'/g'$ to $f4/g4$ may be connected in series so that the variation of the emitted waves results from the altered capacities of the several condensers. The design and size of the condensers are preferably so determined that the first condenser is varied only within the range of wave lengths having four digits, i. e. 1000 to 9999, the second one within the range of three digits, i. e. 100 to 999, etc., so that the position of the individual condensers may be concluded from the added capacities or the transmitted wave length. The total capacity cut into the sender circuit $a$, $b$ in conformity with the position of the individual indexes $e'$ is built up from the capacities of the individual condensers $g'/f'$ and by measuring the transmitted waves the position of the individual indexes may be concluded.

All systems and all methods for steering vehicles by wireless, particularly the wireless steering of airplanes, are open to interference on the part of unauthorized persons who will ascertain the wave length employed and cause undesired steering movements.

It is an object of my invention to prevent such interference. This is effected by a relay for interrupting the circuit of the principal receiver, for instance, its anode or heating circuit, which relay is controlled by an auxiliary receiver gauged for a definite wave length. The principal receiver is permanently interrupted and its circuit is made only by sending an auxiliary wave which operates the relay over the auxiliary receiver. The safety against interference may be increased by providing two or more interrupters and relays so that unauthorized persons cannot find out the wave combination of the auxiliary waves for making the principal receiver ready for reception.

Figure 24:
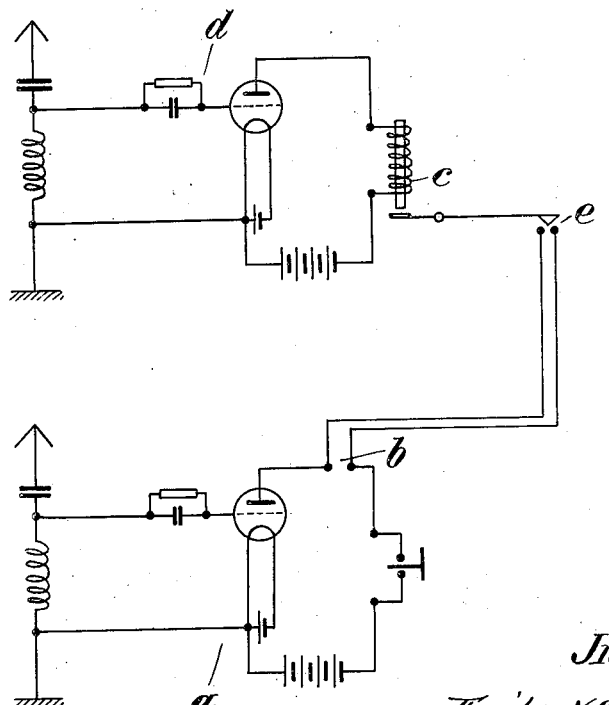

Referring to Fig. 24, $a$ is the principal receiver which is shown with a simple connection by way of example, $b$ is a gap in the anode circuit of the principal receiver, $e$ is an interrupter in the anode circuit, and $c$ is a relay in the circuit of the auxiliary receiver $d$. When the auxiliary wave is sent the relay $c$ is actuated and the interrupter $e$ is closed. Obviously the system may also be reversed, with the anode circuit of the principal receiver normally closed and opened when the auxiliary wave is sent, i. e. the principal receiver becomes ready for operation when the auxiliary wave transmission ceases.

I claim:

1. In a steering apparatus for aircraft, a steering member, an indicator, light-emitting means operatively connected to said indicator, light-responsive means controlled by the emitted light, means for operating said steering member controlled by said light-responsive means, and light-emitting means adapted to influence said light-responsive means independently of said indicator.

2. In a steering apparatus for aircraft, a steering member, an indicator, light-emitting means operatively connected to said indicator, light-responsive means controlled by the emitted light, a condenser adapted to be charged by said light-responsive means, and a relay controlled by the discharge of said condenser and adapted to control said steering member.

3. In a wireless steering apparatus for aircraft, for controlling a group of aircraft, receivers in such aircraft for operating steering members, all receivers operating similar members being tuned to equal wave length, and a sender adapted to emit polarized waves by which each aircraft is controlled individually and independently of the group.

4. In a steering apparatus for aircraft, a steering member, a cylinder having a discharge opening, a piston in said cylinder operatively connected to said member, a valve for admitting medium under pressure to said cylinder, means controlled by current impulses for operating said valve, and independent manually-operated means for effecting the emission of the current impulses.

5. In a wireless steering apparatus for controlling a group of aircraft, receivers in each aircraft for operating steering members, mechanism including a cylinder having a discharge opening, a piston in said cylinder operatively connected to the corresponding steering member, a valve for admitting medium under pressure to said cylinder, means controlled by current impulses for operating said valve and arranged intermediate every receiver and the steering member to be operated by the receiver, all of the receivers operating similar members being tuned to equal wave length, and a sender adapted to emit polarized waves by which each aircraft is controlled individually and independently of the group.

6. In a wireless steering apparatus for aircraft for controlling a group of aircraft, receivers in each aircraft for operating steering members, all receivers operating similar members being tuned to equal wave length; and a sender comprising sets of contacts arranged in various planes, means adapted to be moved for cooperation with the contacts in the individual sets, and contacting means on said movable means, said sender being adapted to emit polarized waves by which each aircraft is controlled individually and independently of the group.

7. In a wireless steering apparatus for aircraft for controlling a group of aircraft, receivers in each aircraft for operating steering members, all receivers operating similar members being tuned to equal wave length; and a sender comprising two sets of contacts arranged in two planes at right angles to each other, a control stick which is mounted to rock about two pivots at right angles to each other for alternate cooperation with the two sets, and contacting means on said stick, said sender being adapted to emit polarized waves by which each aircraft is controlled individually and independently of the group.

8. In a wireless steering apparatus for aircraft for controlling a group of aircraft, receivers in each aircraft for operating steering members, all receivers operating similar members being tuned to equal wave length; and a sender comprising two sets of contacts arranged in two planes at right angles to each other, a control stick which is mounted to rock about two pivots at right angles to each other for alternate cooperation with the two sets, contacting means on said stick, a third set of contacts, a pedal for cooperation with the third set, and contacting means on said pedal, said sender being adapted to emit polarized waves by which each aircraft is controlled individually and independently of the group.

9. In a wireless steering apparatus for aircraft for controlling a group of aircraft, receivers in each aircraft for operating steering members, each receiver including a normally open circuit, another receiver gauged for a definite wave length, a relay in said other receiver for closing said circuit, all of the receivers with said normally open circuits and operating similar members being tuned to equal wave length, and a sender adapted to emit polarized waves by which each aircraft is controlled individually and independently of the group.

10. In a wireless steering apparatus for aircraft for controlling a group of aircraft, receivers in each aircraft for operating steering members, each receiver including a normally closed circuit, another receiver gauged for a definite wave length, a relay in said other receiver for opening said circuit, all of the receivers with said normally closed circuits and operating similar members being tuned to equal wave length, and a sender adapted to emit polarized waves by which each aircraft is controlled individually and independently of the group.

11. In a wireless steering apparatus for controlling a group of aircraft, receivers in each aircraft for operating steering members, a sender, sets of contacts arranged in various planes on said sender, a movable member for opening and closing the contacts in the individual sets, and contacting means on said movable member; for emitting polarized waves to said receivers by which each aircraft is controlled individually and independently of the group.

12. In a wireless steering apparatus for controlling a group of aircraft, receivers in each aircraft for operating steering members, a sender, sets of contacts arranged in two planes at right angles to each other on said sender, a control stick which is mounted to rock about two pivots at right angles to each other, for alternately opening and closing the contacts in the individual sets, and contacting means on said stick; for emitting polarized waves to said receivers by which each aircraft is controlled individually and independently of the group.

13. In a wireless steering apparatus for controlling a group of aircraft, receivers in each aircraft for operating steering members, a sender, two sets of contacts arranged in two planes at right angles to each other on said sender, a control stick which is mounted to rock about two pivots at right angles to each other, for alternately opening and closing the contacts in said two sets, contacting means on said stick, a third set of contacts, a pedal for opening and closing the contacts in the third set, and contacting means on said pedal; for emitting polarized waves to said receivers by which each aircraft is controlled individually and independently of the group.

FRITZ von OPEL.